(12) United States Patent
Takeda et al.

(10) Patent No.: US 11,646,849 B2
(45) Date of Patent: May 9, 2023

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 146 days.

(21) Appl. No.: 16/961,404

(22) PCT Filed: Jan. 12, 2018

(86) PCT No.: PCT/JP2018/000717
§ 371 (c)(1),
(2) Date: Jul. 10, 2020

(87) PCT Pub. No.: WO2019/138555
PCT Pub. Date: Jul. 18, 2019

(65) Prior Publication Data
US 2020/0366445 A1   Nov. 19, 2020

(51) Int. Cl.
*H04L 5/00* (2006.01)
*H04W 28/04* (2009.01)
(Continued)

(52) U.S. Cl.
CPC .......... *H04L 5/0055* (2013.01); *H04L 5/0023* (2013.01); *H04W 28/04* (2013.01); *H04W 72/1273* (2013.01); *H04W 72/23* (2023.01)

(58) Field of Classification Search
CPC ... H04L 5/0055; H04L 5/0023; H04L 1/1861; H04L 1/1812; H04L 1/06; H04L 1/1825;
(Continued)

(56) References Cited

U.S. PATENT DOCUMENTS 9,843,974 B1   12/2017   Touboul et al.
2017/0302341 A1   10/2017   Yu et al.
(Continued)

FOREIGN PATENT DOCUMENTS

WO   2017/221202 A1   12/2017

OTHER PUBLICATIONS

Extended European Search Report issued in counterpart European Application No. 18900332.0 dated Jul. 19, 2021 (7 pages).
(Continued)

*Primary Examiner* — Sharmin Chowdhury
(74) *Attorney, Agent, or Firm* — Osha Bergman Watanabe & Burton LLP

(57) ABSTRACT

To determine an appropriate spatial resource for an uplink control channel. A user terminal includes a receiving section that receives a plurality of entries of information related to a spatial resource for an uplink control channel by using a higher layer, and receives specification information specifying at least one entry among the plurality of entries by using a downlink shared channel, and a control section that controls transmission of delivery acknowledgment information for the downlink shared channel, based on feedback timing of the delivery acknowledgment information and application timing of the spatial resource based on the specification information.

13 Claims, 11 Drawing Sheets

(51) Int. Cl.
*H04W 72/1273* (2023.01)
*H04W 72/23* (2023.01)

(58) Field of Classification Search
CPC .... H04L 1/1896; H04L 1/1854; H04W 28/04; H04W 72/1273; H04W 72/1289; H04W 16/28; H04B 7/0617; H04B 7/086
See application file for complete search history.

(56) References Cited

U.S. PATENT DOCUMENTS

| | | | | |
|---|---|---|---|---|
| 2018/0287682 | A1* | 10/2018 | Kwak | H04W 24/10 |
| 2019/0098586 | A1* | 3/2019 | Akkarakaran | H04B 7/043 |
| 2019/0199412 | A1* | 6/2019 | Koskela | H04W 72/0413 |
| 2020/0305007 | A1* | 9/2020 | Chen | H04B 7/0695 |
| 2021/0084640 | A1* | 3/2021 | Kang | H04B 7/00 |

OTHER PUBLICATIONS

Huawei, HiSilicon; "Beam management for PUCCH"; 3GPP TSG RAM WG1 Meeting #91, R1-1719807; Reno, USA, Nov. 27-Dec. 1, 2017 (6 pages).

Samsung; "Discussion on beam indication for UL transmission"; 3GPP TSG RAN WG1 Meeting #91, R1-1720304; Reno, USA, Nov. 27-Dec. 1, 2017 (5 pages).

Qualcomm; "Summary of Beam Mgmt open issues"; 3GPP TSG RAN WG1 Meeting #91, R1-1721396; Reno, USA, Nov. 27-Dec. 1, 2017 (13 pages).

Qualcomm; "Summary of Beam Mgmt."; 3GPP TSG RAN WG1 Meeting #91, R1-1721696; Reno, USA, Nov. 27-Dec. 1, 2017 (14 pages).

International Search Report issued in Application No. PCT/JP2018/000717, dated Mar. 20, 2018 (5 pages).

Written Opinion issued in International Application No. PCT/JP2018/000717, dated Mar. 20, 2018 (4 pages).

3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).

Office Action in counterpart Japanese Patent Application No. 2019-564248 dated Feb. 15, 2022 (7 pages).

* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In Universal Mobile Telecommunications System (UMTS) networks, the specifications of Long Term Evolution (LTE) have been drafted for the purpose of further increasing high speed data rates, providing lower latency, and so on (see Non-Patent Literature 1). Further, for the purpose of achieving further broadbandization and increased speed beyond LTE (also referred to as, for example, "LTE-Advanced (LTE-A)," "Future Radio Access (FRA)," "4G," "5G," "5G+(plus)," "New RAT (NR)," "LTE Rel. 14," "Rel. 15 (or later versions)," and so on) are also under study.

In existing LTE systems (for example, LTE Rel. 8 to Rel. 13), downlink (DL) and/or uplink (UL) communication is performed by using a subframe (also referred to as a "transmission time interval (TTI)" and so on) of 1 ms. The subframe is a transmission time unit of one data packet subjected to channel coding, and is a processing unit of scheduling, link adaptation, retransmission control (Hybrid Automatic Repeat reQuest (HARQ)), and so on.

Further, in the existing LTE systems (for example, LTE Rel. 8 to Rel. 13), a user terminal transmits uplink control information (UCI) by using an uplink control channel (for example, a Physical Uplink Control Channel (PUCCH)) or an uplink data channel (for example, a Physical Uplink Shared Channel (PUSCH)). A configuration (format) of the uplink control channel is referred to as a "PUCCH format (PF)" and so on.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, LTE Rel. 14 or later versions, NR, 5G, or the like), performance of communication using beamforming (Beam Forming (BF)) is under study.

The user terminal determines a spatial resource (for example, a beam) and an uplink control channel resource, and transmits an uplink control channel by using those resources. However, a problem such as reduction of communication quality may occur unless the uplink control channel is transmitted by using an appropriate spatial resource.

In view of this, the present disclosure has one object to provide a user terminal and a radio communication method that determine an appropriate spatial resource for an uplink control channel.

Solution to Problem

A user terminal according to one aspect of the present disclosure includes a receiving section that receives a plurality of entries of information related to a spatial resource for an uplink control channel by using a higher layer, and receives specification information specifying at least one entry among the plurality of entries by using a downlink shared channel, and a control section that controls transmission of delivery acknowledgment information for the downlink shared channel, based on feedback timing of the delivery acknowledgment information and application timing of the spatial resource based on the specification information.

Advantageous Effects of Invention

According to one aspect of the present disclosure, an appropriate spatial resource can be determined for an uplink control channel.

DESCRIPTION OF EMBODIMENTS

In future radio communication systems (for example, LTE Rel. 14 or later versions, NR, 5G, and the like), performance of communication using beamforming (BF (Beam Forming)) is under study.

For example, a user terminal and/or a radio base station (for example, a gNodeB (gNB)) may use a beam used for transmission of a signal (also referred to as a "transmit beam," a "Tx beam," and so on) and a beam used for reception of a signal (also referred to as a "receive beam," an "Rx beam," and so on). A combination of a transmit beam used on a transmission side and a receive beam used on a reception side may be referred to as a "beam pair link (BPL)."

The user terminal and/or the radio base station may determine a beam, based on measurement of a reference RS. The reference RS (Reference Signal) may be at least one of a synchronization signal block (SSB), a channel state measurement RS (CSI-RS), and a sounding RS (SRS). Note that the SSB may be referred to as an "SS/PBCH (Physical Broadcast Channel) block" and so on.

Figure 1:
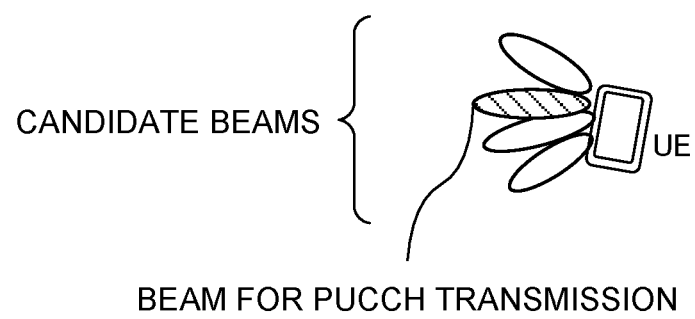
FIG. 1 is a diagram to show an example of a plurality of candidate beams for PUCCH transmission.

Configuration of a plurality of candidate beams for PUCCH transmission as shown in FIG. 1 by using PUCCH spatial relation information is under study. The PUCCH spatial relation information is reported to the UE by using a higher layer (for example, RRC signaling).

The PUCCH spatial relation information may be a list of spatial relation configurations between the reference RS and the PUCCH. The PUCCH spatial relation information includes at least one entry (PUCCH spatial relation information IE (Information Element)). Each entry may indicate an ID associated with the reference RS. Specifically, each entry may include at least one of an SSB index, an NZP (Non-Zero Power)-CSI-RS resource configuration ID, and an SRS resource configuration ID. The SSB index, the NZP-CSI-RS resource configuration ID, and the SRS resource configuration ID may be associated with a beam, a resource, and/or a port selected based on measurement of the reference RS.

One of a plurality of entries (candidate beams or pieces of PUCCH spatial relation information) may be indicated by a Medium Access Control (MAC) Control Element (CE). This MAC CE may be referred to as a "spatial information MAC CE." The spatial information MAC CE may indicate an index of an entry to be used for PUCCH transmission. When the PUCCH spatial relation information includes one PUCCH spatial relation information IE, the MAC CE need not be used.

When the UE determines one entry, the UE may transmit the PUCCH, based on the PUCCH spatial relation information associated with the entry. When the reference RS is a downlink RS (SSB or CSI-RS), an entry may be associated with a receive beam that is selected based on measurement of the reference RS, and the UE may transmit the PUCCH by using a transmit beam that is associated with the receive beam associated with the entry. Alternatively, the PUCCH may be transmitted by using a transmit beam, precoding, an antenna port, an antenna panel, or the like for which a base station receiver can assume spatial Quasi Co-Location (QCL) with the downlink RS (SSB or CSI-RS) associated with the entry. When the reference RS is an uplink RS (SRS), an entry may be associated with a transmit beam selected based on measurement of the reference RS, and the UE may transmit the PUCCH by using the transmit beam associated with the entry. Alternatively, the PUCCH may be transmitted by using a transmit beam, precoding, an antenna port, an antenna panel, or the like for which a base station receiver can assume spatial QCL with the uplink RS (SRS) associated with the entry. The PUCCH spatial relation information is hereinafter referred to as a 2PUCCH beam," a "transmit beam," an "uplink beam," or a "beam" for the sake of simplicity.

In contrast, regarding a PUCCH resource, dynamic configuration by using Downlink Control Information (DCI) is under study. Therefore, granularity of timing of controlling a beam for the PUCCH by using the MAC CE is coarser than granularity of timing of controlling a PUCCH resource by using DCI. In other words, it is difficult to specify one beam for one dynamically determined PUCCH resource by using the MAC CE.

Figure 2:
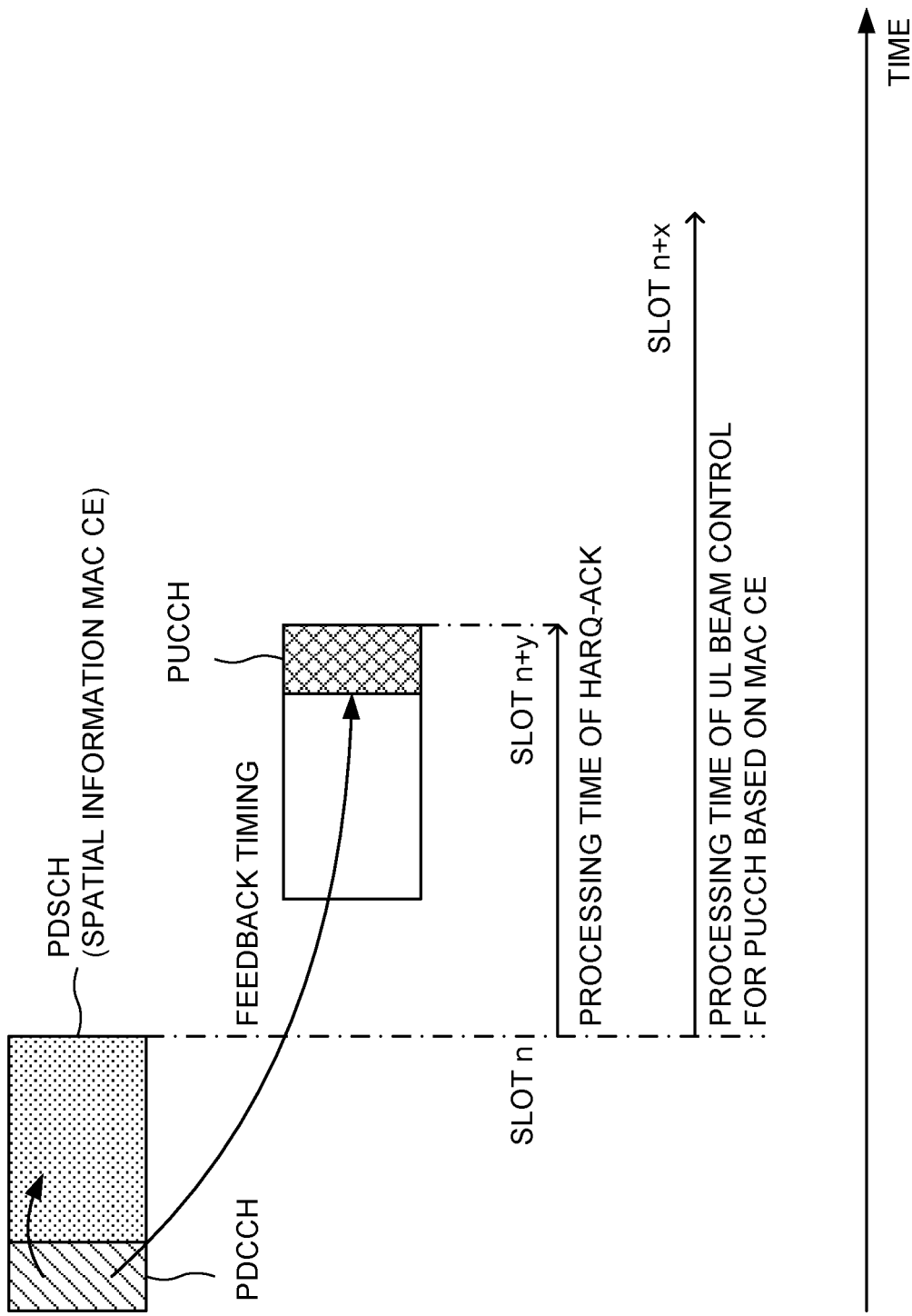
FIG. 2 is a diagram to show an example of a relationship between feedback timing of a HARQ-ACK and effective timing of a spatial information MAC CE.

For example, assume, as shown in FIG. 2, that processing time of UL beam control for the PUCCH based on the MAC CE is represented by x slots, and processing time of a HARQ-ACK is represented by y slots. With respect to a PDSCH carrying a spatial information MAC CE for a PUCCH, the spatial information MAC CE becomes effective in slot n+x or later, and a HARQ-ACK on the PUCCH is transmitted in slot n+y. In this case, x and y are not necessarily equal.

Further, even when the UE receives DCI used to schedule the PDSCH carrying a spatial information MAC CE, the UE may fail in decoding of the spatial information MAC CE. When an error occurs in the PDSCH in this manner, timing at which the spatial information MAC CE is applied is delayed with respect to slot n+y, because the spatial information MAC CE will be applied after the PDSCH including the MAC CE is retransmitted and is then successfully received and decoded. In other words, timing at which a HARQ-ACK is applied (feedback timing) and timing at which a spatial information MAC CE becomes effective (effective timing or timing at which a spatial information MAC CE is applied (application timing)) may not necessarily match.

For example, when x represents 8 slots (for example, similarly to the existing LTE systems) and y represents 2 slots, the feedback timing of a HARQ-ACK (slot n+2) occurs before the effective timing (slot n+8) of a spatial information MAC CE. The radio base station cannot foresee that a transmit beam will be implementable in slot n+8 when a spatial information MAC CE is transmitted in slot n.

In view of this, the inventors of the present invention studied control on HARQ-ACK transmission to which a spatial information MAC CE may be applied, and arrived at the present invention.

Embodiments according to the present disclosure will be described in detail with reference to the drawings as follows. Aspects of each embodiment may be employed independently or may be employed in combination.

A plurality of PUCCH resource sets may be configured using a higher layer (for example, RRC signaling). Each of the PUCCH resource sets includes a plurality of PUCCH resources. When the UE transmits Uplink Control Information (UCI) by using the PUCCH, the UE determines one PUCCH resource set from the plurality of PUCCH resource sets, based on a payload of the UCI. The UE determines one PUCCH resource from the determined PUCCH resource set, based on a PUCCH resource indication.

The PUCCH resource indication may be a DCI indication (specific field in DCI), may be a specific parameter (implicit indication), or may be a combination of those. The specific parameter may be at least one of a Control Channel Element (CCE) index, a specific Physical Resource Block (PRB) index of a scheduled PDSCH, a UE-ID, and a C-RNTI (Cell-Radio Network Temporary Identifier).

The UE may determine a PUCCH resource, based on a type of UCI. For example, when the UCI is Channel State Information (CSI) only, the UE may determine one PUCCH resource for the CSI that is configured using a higher layer. For example, when the UCI is a HARQ-ACK, the UE may determine a PUCCH resource set from a plurality of PUCCH resource sets for a HARQ-ACK configured using a higher layer, according to the number of bits of the HARQ-ACK, and may determine a PUCCH resource according to a specific field of DCI used to schedule a PDSCH corresponding to the HARQ-ACK.

The MAC CE may indicate a plurality of entries that correspond to a plurality of respective PUCCH resource candidates that may be specified by DCI among a plurality of entries of PUCCH spatial relation information configured using a higher layer. This MAC CE may be referred to as a "spatial information MAC CE." The spatial information MAC CE may indicate the entry by an index of an entry in the PUCCH spatial relation information (entry index).

The UE may control a beam for the PUCCH by applying an entry indicated by the spatial information MAC CE to PUCCH transmission.

By specifying an entry for a dynamically configurable PUCCH resource in advance by using a spatial information MAC CE, the UE can control a beam for a dynamically configured PUCCH resource.

Note that the following description adopts a slot as a time unit, but the slot may be replaced with any of a symbol, a subframe, a sub-slot, a radio frame, and so on.

(First Aspect)

The UE may perform control of spatial relation information to be applied to a PUCCH for transmitting a HARQ-ACK, based on whether a HARQ-ACK feedback for a PDSCH carrying a spatial information MAC CE occurs before, at the same time as, or after effective timing of the spatial information MAC CE.

The radio base station may use DCI used to schedule a PDSCH including a spatial information MAC CE to indicate a HARQ-ACK resource for the PDSCH (for example, HARQ-ACK timing indication information). The feedback timing of the HARQ-ACK specified by the DCI may occur at the same time as or after the effective timing of the spatial information MAC CE.

Figure 3:
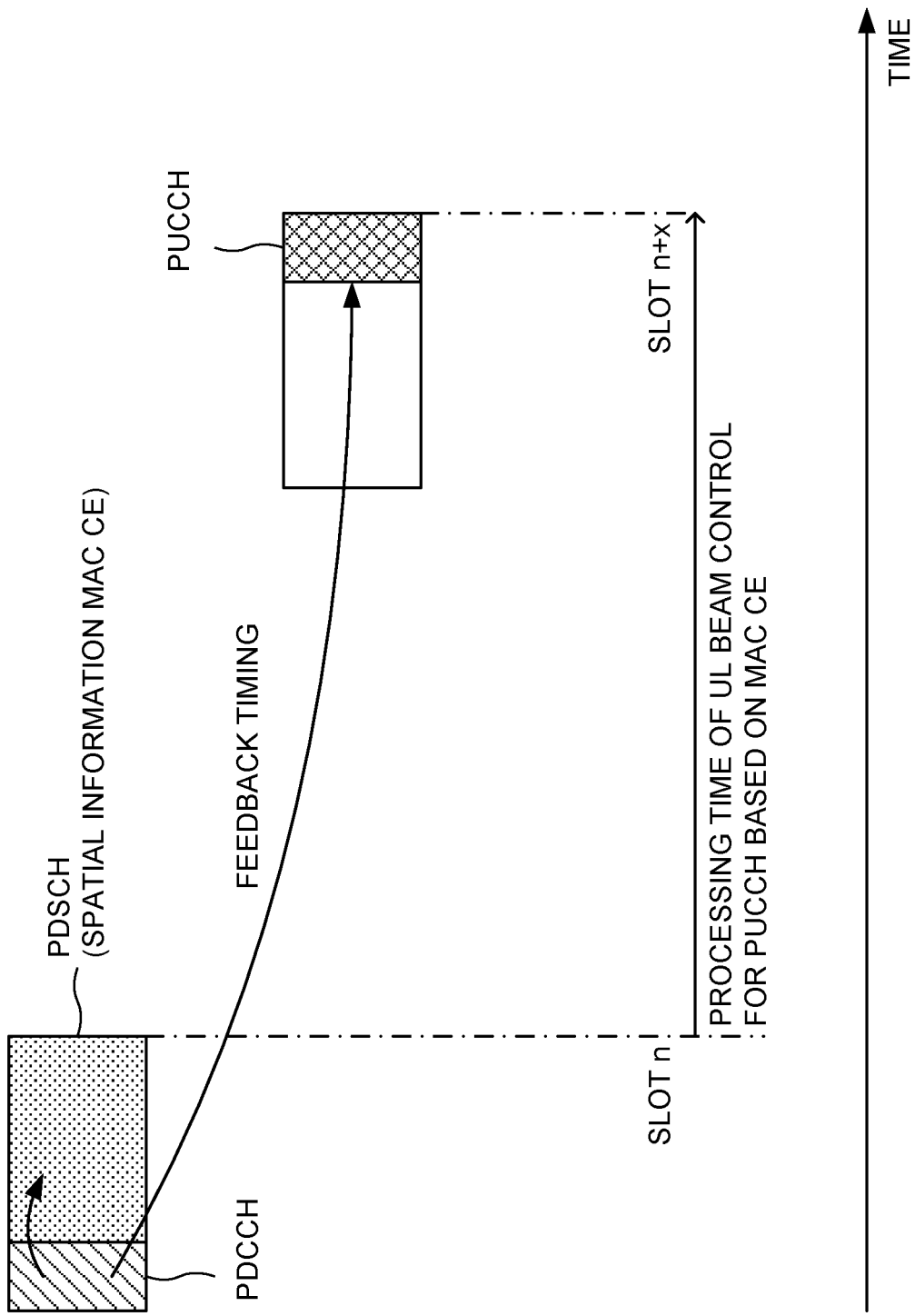
FIG. 3 is a diagram to show an example of feedback timing according to a first aspect.

As shown in FIG. 3, when indicated feedback timing occurs at the same time as or after the effective timing (slot n+x), the UE transmits the HARQ-ACK on the PUCCH to which the entry indicated by the spatial information MAC CE is applied. Through this operation, the spatial information MAC CE can be surely applied to HARQ-ACK transmission for the spatial information MAC CE, and reception performance of the PUCCH can be improved.

Either of the following variations 1 and 2 may be applied.

<Variation 1>

When feedback timing of a HARQ-ACK occurs before effective timing of a spatial information MAC CE, the UE need not transmit the HARQ-ACK on a PUCCH using an entry indicated by the spatial information MAC CE.

Either of the following options 1-1 and 1-2 may be applied to variation 1-1.

<<Option 1-1>>

Instead of using an entry indicated by a spatial information MAC CE included in a PDSCH corresponding to a HARQ-ACK, the UE may transmit the HARQ-ACK on a PUCCH using an entry indicated by a spatial information MAC CE that became effective last before the HARQ-ACK transmission. Through this operation, even when effective timing of a spatial information MAC CE corresponding to a HARQ-ACK fails to precede HARQ-ACK transmission, another entry (for example, a beam) can be applied to the HARQ-ACK transmission.

<<Option 1-2>>

The UE may transmit the HARQ-ACK on a PUCCH using default spatial relation information that is configured or defined in advance. Through this operation, even when effective timing of a spatial information MAC CE corresponding to a HARQ-ACK fails to precede HARQ-ACK transmission, another entry (for example, a beam) can be applied to the HARQ-ACK transmission. The default spatial relation information may be spatial relation information that corresponds to an entry having the smallest index among the entries of PUCCH spatial relation information, or may be spatial relation information that is configured separately by using higher layer signaling such as broadcast information and RRC.

<Variation 2>

When feedback timing of a HARQ-ACK occurs before effective timing of a spatial information MAC CE, the UE need not transmit the HARQ-ACK. According to this operation, an entry specified by a spatial information MAC CE in a corresponding PDSCH is invariably applied to a HARQ-ACK to be transmitted.

According to the first aspect described above, the UE and the radio base station can determine HARQ-ACK transmission and an entry (for example, a beam) to be applied to the HARQ-ACK transmission, based on feedback timing of a HARQ-ACK and effective timing of a spatial information MAC CE.

(Second Aspect)

Based on whether a PDSCH carries (includes) a spatial information MAC CE, the UE may determine feedback timing of a HARQ-ACK for the PDSCH.

Figure 4:
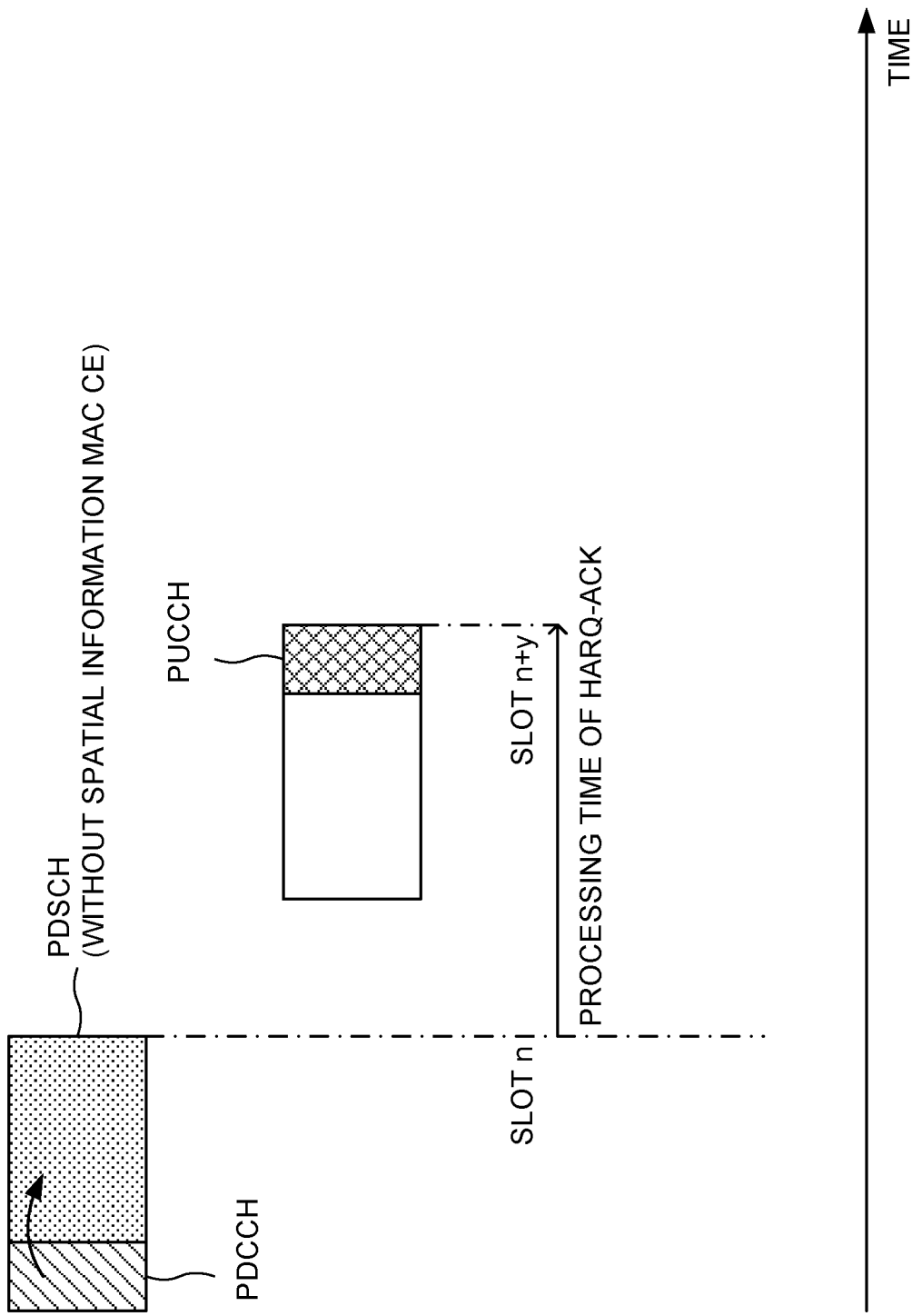
FIG. 4 is a diagram to show an example of feedback timing for a PDSCH not including a spatial information MAC CE.

As shown in FIG. 4, when a spatial information MAC CE is not included in a PDSCH, feedback timing of a HARQ-ACK may occur after the elapse of a given time period from the PDSCH. For example, suppose the given time period corresponds to 4 slots. In this case, when the UE receives a PDSCH not including a spatial information MAC CE in slot n, the UE may transmit a HARQ-ACK corresponding to the PDSCH in slot n+4. The given time period may be determined based on information included in DCI used to schedule the PDSCH including a spatial information MAC CE.

Figure 5:
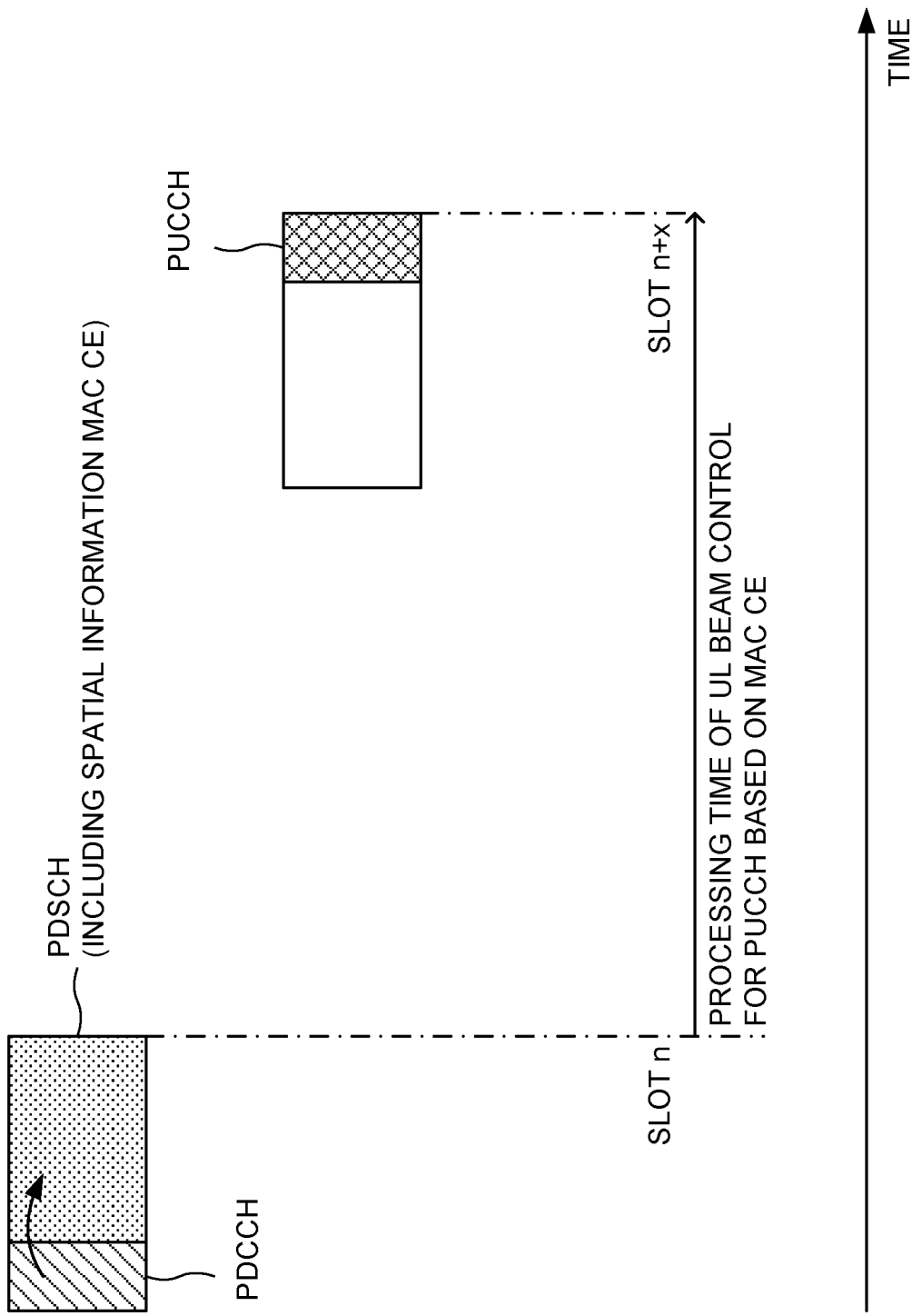
FIG. 5 is a diagram to show an example of feedback timing for a PDSCH including a spatial information MAC CE.

As shown in FIG. 5, when a PDSCH includes a spatial information MAC CE, feedback timing of a HARQ-ACK may occur at the same time as effective timing of a spatial information MAC CE. For example, suppose a PDSCH including a spatial information MAC CE occurs in slot n. In this case, when effective timing of the spatial information MAC CE occurs in slot n+8, the UE may transmit a HARQ-ACK corresponding to the PDSCH in slot n+8.

Alternatively, when a spatial information MAC CE is included in a PDSCH, the UE may transmit a HARQ-ACK at least at effective timing of the spatial information MAC CE. In this case, the HARQ-ACK can also be transmitted after the elapse of a given time period from the PDSCH (for example, after the elapse of a given time period that is determined based on information included in DCI used to schedule the PDSCH including a spatial information MAC CE), as well as at the effective timing of the spatial information MAC CE. According to this method, when a HARQ-ACK is already reserved at a time point after the elapse of a given time period from the PDSCH (for example, after the elapse of a given time period that is determined based on information included in DCI used to schedule the PDSCH including a spatial information MAC CE), control of canceling (stopping) transmission of the HARQ-ACK can be omitted, and thus complexity of terminal processing can be avoided.

According to the second aspect described above, the UE can control feedback timing of a HARQ-ACK for a PDSCH, based on the contents of a PDSCH. Further, effective timing of a spatial information MAC CE can be prioritized over feedback timing of a HARQ-ACK. Thus, a spatial information MAC CE can be surely applied to a HARQ-ACK for a PDSCH including the spatial information MAC CE. Further, feedback timing of a PDSCH not including a spatial information MAC CE is set to occur earlier than feedback timing of a PDSCH including a spatial information MAC CE. This setting allows reduction of delay of the PDSCH not including a spatial information MAC CE.

Further, the present aspect is effective in a case in which DCI used to schedule a PDSCH does not include HARQ-ACK timing indication information. For example, such a case may be a case in which the DCI is fallback DCI or compact DCI, or may be a case during initial access.

(Third Aspect)

When DCI used to schedule a PDSCH cannot change feedback timing of a HARQ-ACK for the PDSCH, for example, when the DCI does not include HARQ-ACK timing indication information, the UE may transmit a PUCCH by using spatial information configured in advance. In this case, the spatial information is not changed based on a MAC CE.

The spatial information configured in advance may be any one of an entry, a PUCCH spatial relation information IE, and a beam. The spatial information configured in advance may be fixed according to a specification, or may be (semi-statically) configured using a higher layer (for example, RRC signaling).

According to the third aspect described above, processing delay due to decoding and application of a spatial information MAC CE can be prevented by not changing spatial information based on a MAC CE.

(Fourth Aspect)

A spatial information MAC CE indicating spatial information for a PUCCH resource will be described. The spatial information may indicate an entry of PUCCH spatial relation information, or may be, for example, an entry index. The configuration of the spatial information MAC CE may be any one of the following configurations 1, 2, and 3.

<Configuration 1>

Spatial information for one PUCCH resource may be indicated by a MAC CE.

The PUCCH resource may be indicated by the radio base station for a HARQ-ACK for a PDSCH including a spatial information MAC CE. For example, the PUCCH resource may be indicated by DCI used to schedule the PDSCH and/or another parameter. The PUCCH resource may indicate timing and/or a resource of a HARQ-ACK.

Based on the timing and/or the resource of a HARQ-ACK, the UE may recognize correspondence between the spatial information MAC CE and the spatial information associated with a PUCCH resource.

<Configuration 2>

Spatial information for at least one available PUCCH resource for one PUCCH resource set may be indicated by a MAC CE.

The at least one available PUCCH resource may belong to a PUCCH resource set for a HARQ-ACK for a PDSCH including a spatial information MAC CE.

Based on a HARQ-ACK or a payload of UCI, the UE may recognize correspondence between the spatial information MAC CE and the spatial information associated with a PUCCH resource set.

Further, based on a header field of the spatial information MAC CE, the UE may recognize correspondence between the spatial information MAC CE and the spatial information associated with a PUCCH resource. The spatial information MAC CE may include an indication field that specifies entries corresponding to respective PUCCH resources.

One of the at least one available PUCCH resource may be indicated by DCI used to schedule a PDSCH including a spatial information MAC CE and/or another parameter.

<Configuration 3>

Spatial information for at least one available PUCCH resource for at least one available PUCCH resource set may be indicated by a MAC CE.

The at least one available PUCCH resource may belong to at least one available PUCCH resource set for a HARQ-ACK for a PDSCH including a spatial information MAC CE.

Based on a header field of the spatial information MAC CE, the UE may recognize correspondence between the spatial information MAC CE and the spatial information associated with a PUCCH resource belonging to a PUCCH resource set. For example, when 4 PUCCH resource sets are configured for the UE by using a higher layer and each of the PUCCH resource sets includes 8 PUCCH resources, the spatial information MAC CE specifies entries corresponding to the 32 respective PUCCH resources. The spatial information MAC CE may include an indication field that specifies entries corresponding to respective PUCCH resources.

One of the at least one available PUCCH resource may be indicated by DCI used to schedule a PDSCH including a spatial information MAC CE and/or another parameter.

According to the fourth aspect described above, an entry corresponding to a PUCCH resource can be specified using a MAC CE, among a plurality of entries in PUCCH spatial relation information that is configured using a higher layer. Thus, the UE can switch pieces of spatial information (beams) to be applied to the PUCCH by using the MAC CE.

(Radio Communication System)

Hereinafter, a structure of a radio communication system according to the present embodiment will be described. In the radio communication system, communication is performed using at least one combination of the plurality of aspects described above.

Figure 6:
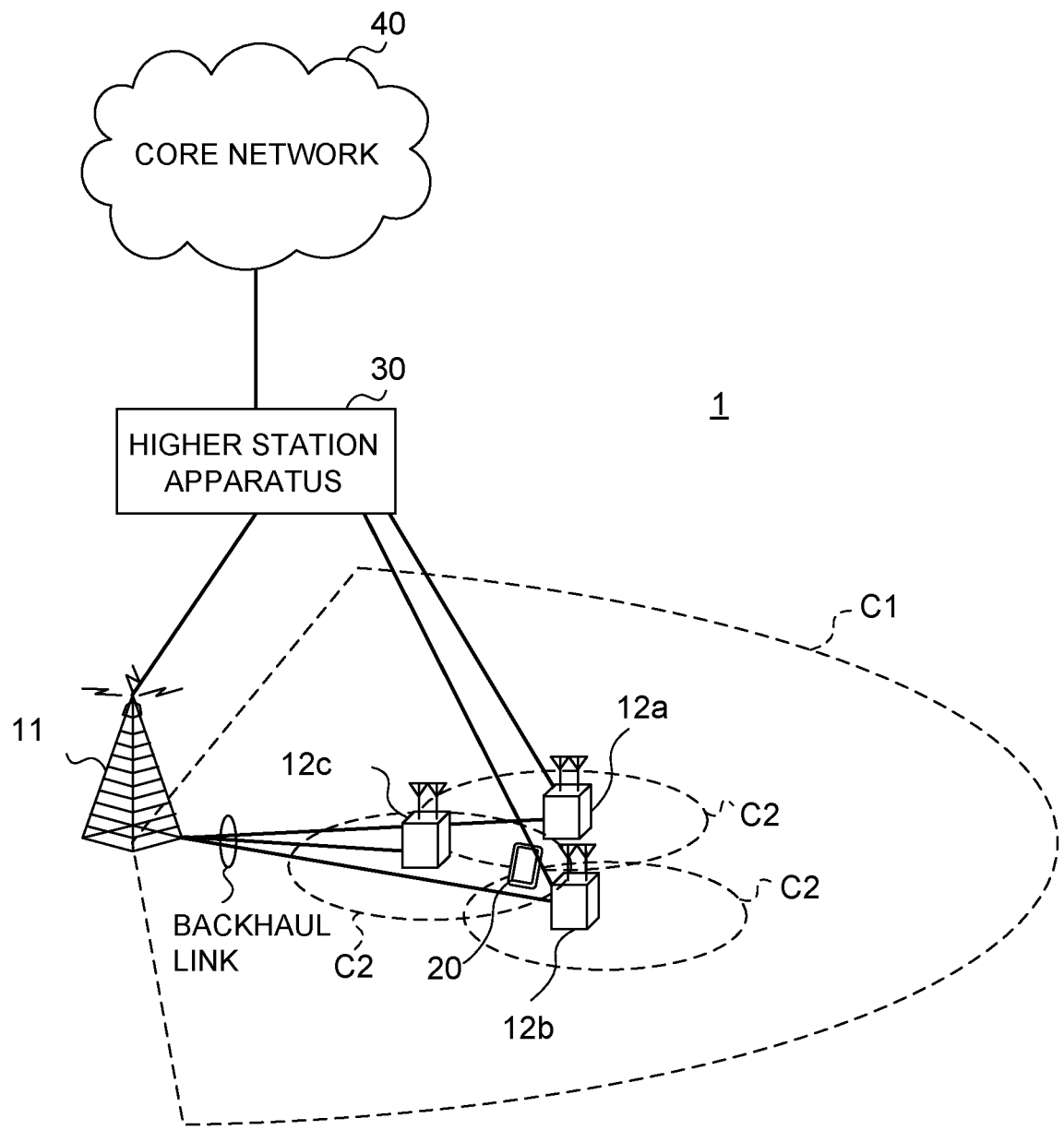
FIG. 6 is a diagram to show an example of a schematic structure of a radio communication system according to the present embodiment.

FIG. 6 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "Long Term Evolution (LTE)," "LTE-Advanced (LTE-A)," "LTE-Beyond (LTE-B)," "SUPER 3G," "IMT-Advanced," "4th generation mobile communication system (4G)," "5th generation mobile communication system (5G)," "New Radio (NR)," "Future Radio Access (FRA)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. Further, the user terminals 20 may execute CA or DC by using a plurality of cells (CCs) (for example, five or less CCs or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a given signal and/or channel, and for example, may indicate at least one of a subcarrier spacing, a bandwidth, a symbol length, a cyclic prefix length, a subframe length, a TTI length, the number of symbols per TTI, a radio frame structure, a filter processing, a windowing processing, and so on.

A wired connection (for example, means in compliance with the Common Public Radio Interface (CPRI) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNodeB (eNB)," a "transmitting/receiving point" and so on. The radio base stations 12 are radio base stations having local coverages, and may be referred to as "small base stations," "micro base stations," "pico base stations," "femto base stations," "Home eNodeBs (HeNBs)," "Remote Radio Heads (RRHs)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (Physical Downlink Shared Channel (PDSCH)), which is used by each user terminal 20 on a shared basis, a broadcast channel (Physical Broadcast Channel (PBCH)), downlink L1/L2 control channels and so on, are used as downlink channels. User data, higher layer control information, System Information Blocks (SIBs) and so on are transmitted on the PDSCH. The Master Information Blocks (MIBs) are transmitted on the PBCH.

The downlink L1/L2 control channels include at least one of a downlink control channel (a Physical Downlink Control Channel (PDCCH), an Enhanced Physical Downlink Control Channel (EPDCCH)), a Physical Control Format Indicator Channel (PCFICH), and/or a Physical Hybrid-ARQ Indicator Channel (PHICH). Downlink control information (DCI), including PDSCH and/or PUSCH scheduling information, and so on are transmitted on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is transmitted on the PCFICH. Delivery acknowledgment information (for example, also referred to as "retransmission control information," "HARQ-ACK," "ACK/NACK," and so on) of Hybrid Automatic Repeat reQuest (HARQ) to a PUSCH is transmitted on the PHICH. The EPDCCH is frequency-division multiplexed with the PDSCH (downlink shared data channel) and used to transmit DCI and so on, like the PDCCH.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on are used as uplink channels. User data, higher layer control information and so on are transmitted on the PUSCH. In addition, radio link quality information (Channel Quality Indicator (CQI)) of the downlink, delivery acknowledgment information, scheduling request (SR), and so on are transmitted on the PUCCH. By means of the PRACH, random access preambles for establishing connections with cells are transmitted.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (Sounding Reference Signal (SRS)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 7:
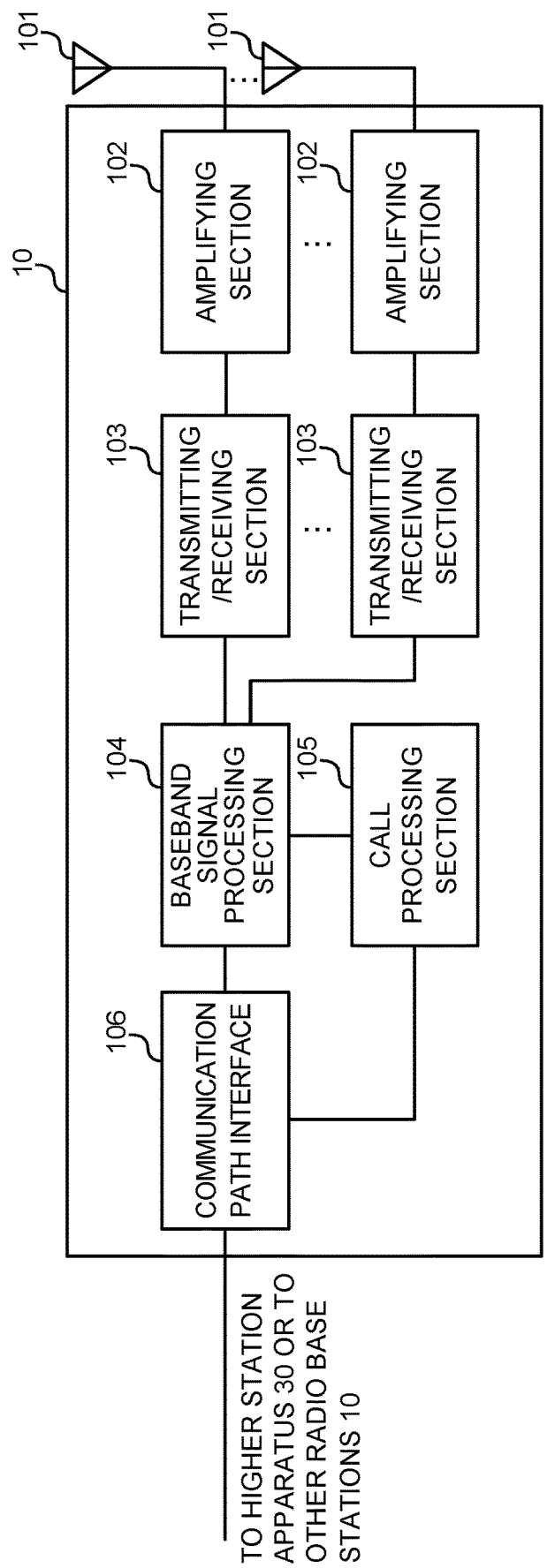
FIG. 7 is a diagram to show an example of an overall structure of a radio base station according to the present embodiment.

FIG. 7 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a Packet Data Convergence Protocol (PDCP) layer process, division and coupling of the user data, Radio Link Control (RLC) layer transmission processes such as RLC retransmission control, Medium Access Control (MAC) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the radio base station 10, manages the radio resources and so on.

The communication path interface 106 transmits and/or receives signals to and/or from the higher station apparatus 30 via a given interface. The communication path interface 106 may transmit and/or receive signals (backhaul signaling) with other radio base stations 10 via an inter-base station interface (for example, an optical fiber in compliance with the Common Public Radio Interface (CPRI) and an X2 interface).

Note that the transmitting/receiving sections 103 may further include analog beamforming sections that perform analog beamforming. The analog beamforming sections can be constituted with analog beamforming circuits (for example, phase shifters and phase shift circuits) or analog beamforming apparatus (for example, phase shifting apparatus) that can be described based on general understanding of the technical field to which the present invention pertains. The transmitting/receiving antennas 101 can be constituted with array antennas, for example. The transmitting/receiving sections 103 are configured to be capable of employing single BF and multi-BF.

Further, the transmitting/receiving sections 103 may transmit and/or receive a signal by using a given beam that is determined by the control section 301.

Further, the transmitting/receiving sections 103 may transmit a plurality of entries of information related to a spatial resource for an uplink control channel by using a higher layer. Further, the transmitting/receiving sections 103 may transmit specification information specifying at least one entry among the plurality of entries by using a downlink shared channel.

Further, the transmitting/receiving sections 103 may transmit feedback timing of delivery acknowledgment information for the downlink shared channel by using downlink control information.

Further, the transmitting/receiving sections 103 may transmit downlink control information (DCI) and/or another parameter for determining one uplink control channel resource of an uplink control channel resource set.

Figure 8:
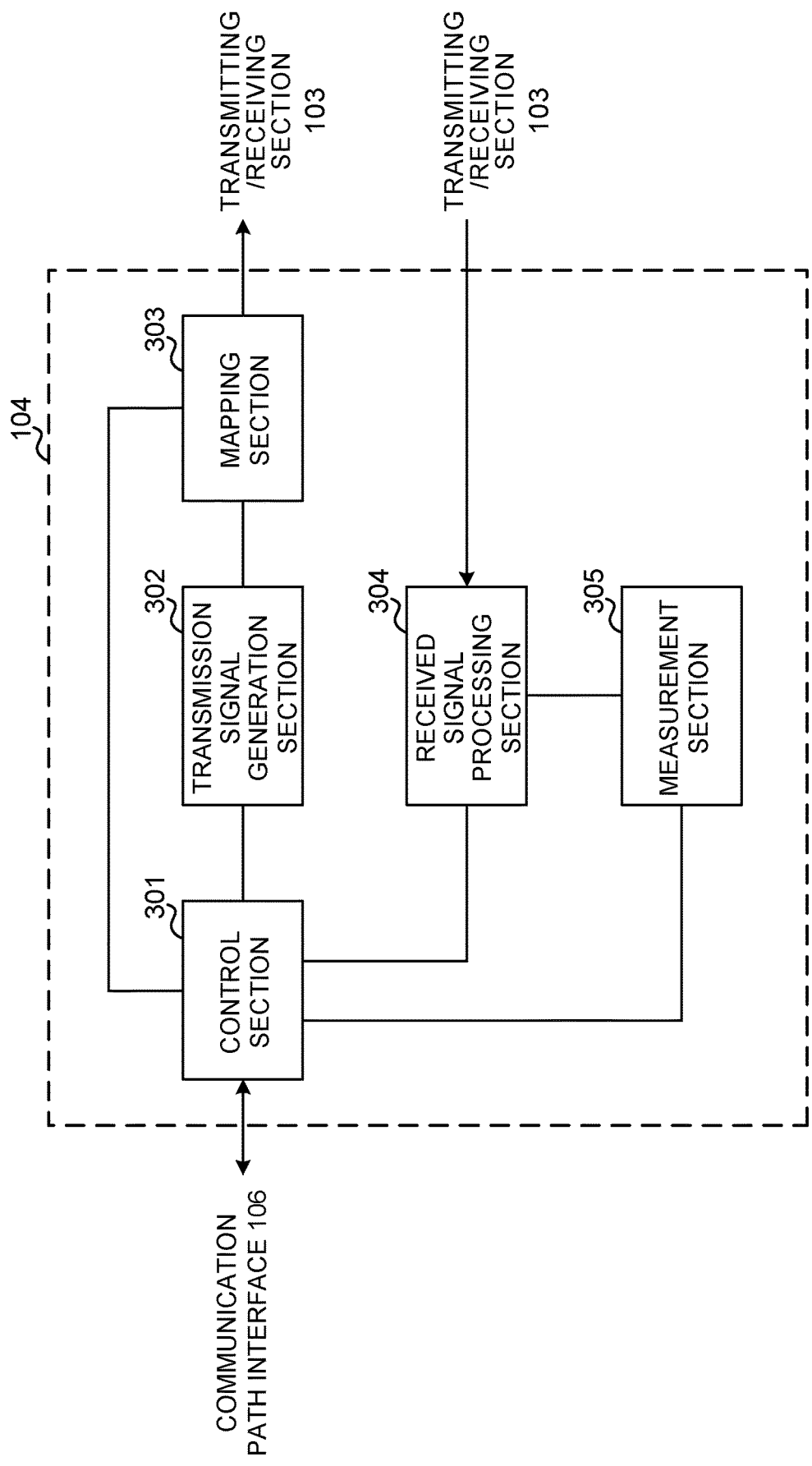
FIG. 8 is a diagram to show an example of a functional structure of the radio base station according to the present embodiment.

FIG. 8 is a diagram to show an example of a functional structure of the radio base station according to the present embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource allocation) of system information, a downlink data signal (for example, a signal transmitted on the PDSCH), a downlink control signal (for example, a signal transmitted on the PDCCH and/or the EPDCCH, delivery acknowledgment information, and so on). Based on the results of determining necessity or not of retransmission control to the uplink data signal, or the like, the control section 301 controls generation of a downlink control signal, a downlink data signal, and so on.

The control section 301 control the scheduling of a synchronization signal (for example, a PSS/SSS), a downlink reference signal (for example, a CRS, a CSI-RS, a DMRS), and so on.

The control section 301 may perform control of forming transmit beams and/or receive beams, by using digital BF (for example, precoding) performed by the baseband signal processing section 104 and/or analog BF (for example, phase rotation) performed by the transmitting/receiving sections 103.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing, modulation processing, and the like are performed in accordance with a coding rate, modulation scheme, or the like determined based on channel state information (CSI) from each user terminal 20.

The mapping section 303 maps the downlink signals generated in the transmission signal generation section 302 to given radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform Radio Resource Management (RRM) measurement, Channel State Information (CSI) measurement, and so on, based on the received signal. The measurement section 305 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 301.

<User Terminal>

Figure 9:
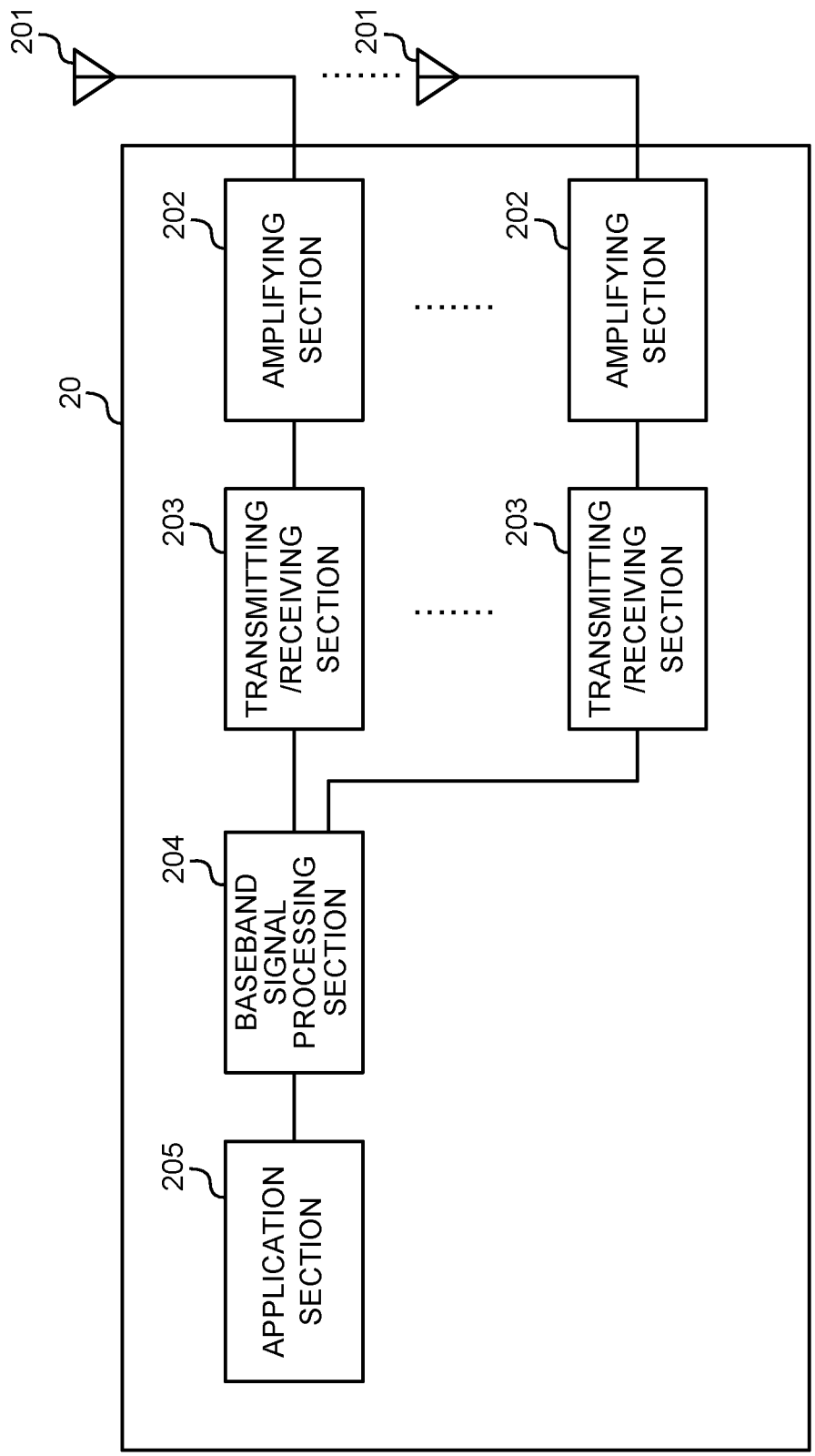
FIG. 9 is a diagram to show an example of an overall structure of a user terminal according to the present embodiment.

FIG. 9 is a diagram to show an example of an overall structure of the user terminal according to the present embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Note that the transmitting/receiving sections 203 may further include analog beamforming sections that perform analog beamforming. The analog beamforming sections can be constituted with analog beamforming circuits (for example, phase shifters and phase shift circuits) or analog beamforming apparatus (for example, phase shifting apparatus) that can be described based on general understanding of the technical field to which the present invention pertains. The transmitting/receiving antennas 201 can be constituted with array antennas, for example. The transmitting/receiving sections 203 may be configured to be capable of employing single BF and multi-BF.

Further, the transmitting/receiving sections 203 may transmit and/or receive a signal by using a given beam that is determined by the control section 401.

Further, the transmitting/receiving sections 203 may receive a plurality of entries of information (for example, an ID indicating an RS associated with a beam) related to a spatial resource (for example, a beam) for an uplink control channel (for example, a PUCCH) by using a higher layer (for example, RRC signaling), and may receive specification information (for example, a spatial information MAC CE) specifying at least one entry among the plurality of entries by using a downlink shared channel (for example, a PDSCH).

Further, the transmitting/receiving sections 203 may receive feedback timing of delivery acknowledgment information for the downlink shared channel by using downlink control information (DCI).

Further, the transmitting/receiving sections 203 may receive downlink control information (DCI) for determining one uplink control channel resource (PUCCH resource) of an uplink control channel resource set (PUCCH resource set).

Figure 10:
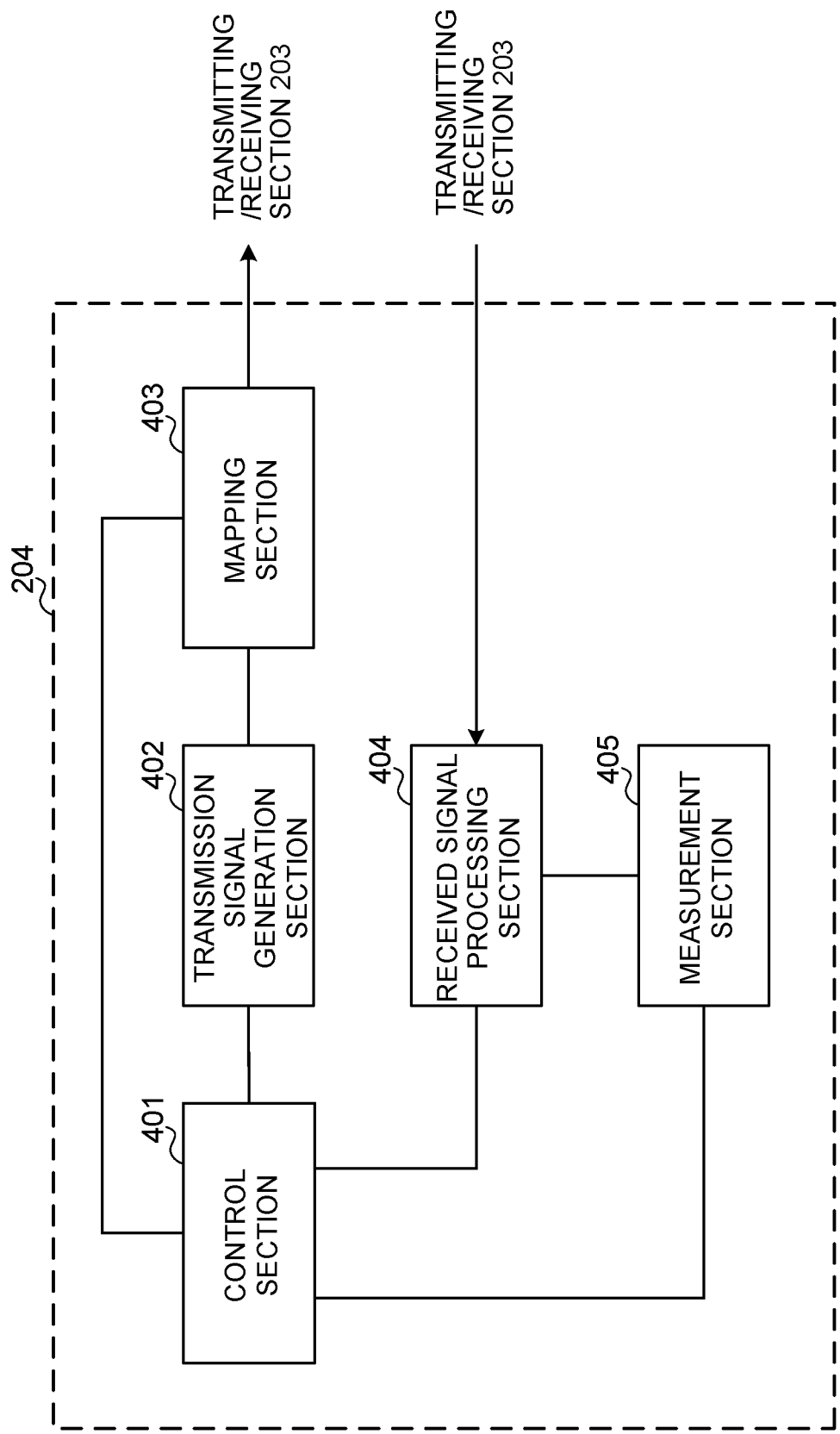
FIG. 10 is a diagram to show an example of a functional structure of the user terminal according to the present embodiment.

FIG. 10 is a diagram to show an example of a functional structure of the user terminal according to the present embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may perform control of forming transmit beams and/or receive beams, by using digital BF (for example, precoding) performed by the baseband signal processing section 204 and/or analog BF (for example, phase rotation) performed by the transmitting/receiving sections 203.

The control section 401 may control radio link monitoring (RLM) and/or beam recovery (BR), based on measurement results of the measurement section 405.

Further, the control section 401 may control transmission of delivery acknowledgment information (for example, a HARQ-ACK), based on feedback timing (for example, timing indicated by DCI used to schedule a PDSCH or timing after the elapse of a given time period from a slot of a PDSCH) of the delivery acknowledgment information for the downlink shared channel (for example, a PDSCH) and application timing of the spatial resource (for example, an entry or a PUCCH spatial relation information IE) based on the specification information (for example, a spatial information MAC CE).

Further, the control section 401 may determine whether or not to apply the spatial resource specified by the specification information to the transmission of the delivery acknowledgment information, based on a relationship between the feedback timing and the application timing (first aspect).

Further, the control section 401 may determine whether or not to transmit the delivery acknowledgment information, based on a relationship between the feedback timing and the application timing (first aspect, variation 2).

Further, the control section 401 may determine different feedback timing, based on whether or not the downlink shared channel includes the specification information (second aspect).

Further, when downlink control information used to schedule the downlink shared channel does not include an indication of the feedback timing, the control section 401 may apply the spatial resource configured in advance to the transmission of the delivery acknowledgment information (third aspect).

Further, the control section 401 may determine one of a plurality of uplink control channel resource sets, based on uplink control information (UCI) transmitted on an uplink control channel. Further, the control section 401 may determine one uplink control channel resource from the uplink control channel resource set, based on downlink control information (DCI).

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about delivery acknowledgment information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

<Hardware Structure>

Note that the block diagrams that have been used to describe the present embodiment show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 11:
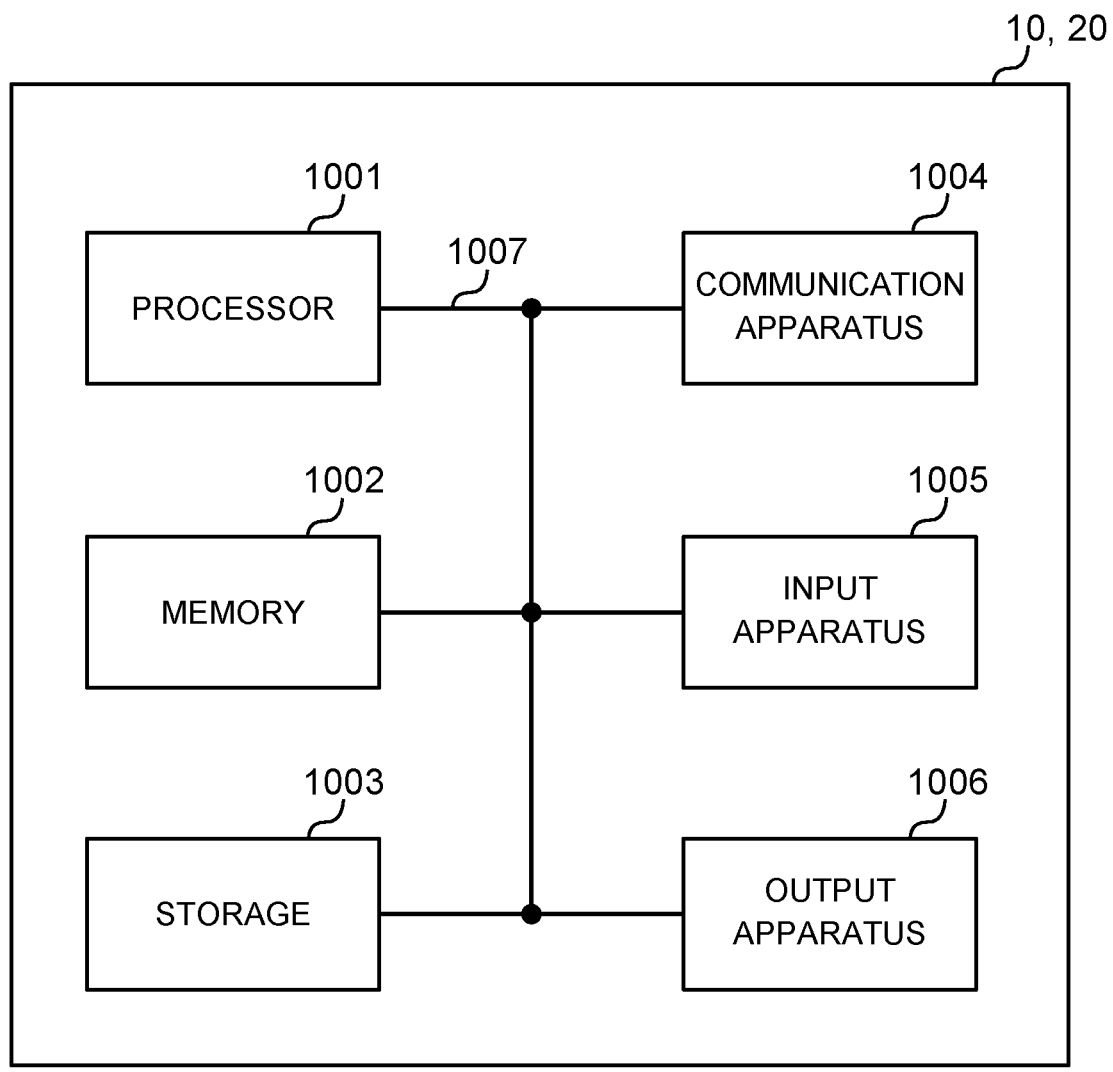
FIG. 11 is a diagram to show an example of a hardware structure of the radio base station and the user terminal according to the present embodiment.

For example, a radio base station, a user terminal, and so on according to the present embodiment may function as a computer that executes the processes of each aspect of the present embodiment. FIG. 11 is a diagram to show an example of a hardware structure of the radio base station and the user terminal according to the present embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described present embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to the present embodiment.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an Application Specific Integrated Circuit (ASIC), a Programmable Logic Device (PLD), an Field Programmable Gate Array (FPGA), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to given values, or may be represented in another corresponding information. For example, radio resources may be specified by given indices.

The names used for parameters and so on in this specification are in no respect limiting. For example, since various channels (Physical Uplink Control Channel (PUCCH), Physical Downlink Control Channel (PDCCH), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/present embodiments described in this specification, and other methods may be used as well. For example, reporting of information may be implemented by using physical layer signaling (for example, downlink control information (DCI), uplink control information (UCI)), higher layer signaling (for example, Radio Resource Control (RRC) signaling, broadcast information (master information block (MIB), system information blocks (SIBs), and so on), Medium Access Control (MAC) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/present embodiment of the present disclosure may be applied to a configuration in which communication between a radio base station and a user terminal is replaced with communication among a plurality of user terminals (Device-to-Device (D2D)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GW), and so on may be possible, but these are not limiting) other than base stations, or combinations of these.

The aspects/present embodiments illustrated in this specification may be used individually or in combinations, which may be switched depending on the mode of implementation. The order of processes, sequences, flowcharts, and so on that have been used to describe the aspects/present embodiments herein may be re-ordered as long as inconsistencies do not arise. For example, although various methods have been illustrated in this specification with various components of steps in exemplary orders, the specific orders that are illustrated herein are by no means limiting.

The aspects/present embodiments illustrated in this specification may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-RAT (Radio Access Technology), New Radio (NR), New radio access (NX), Future generation radio access (FX), GSM (registered trademark) (Global System for Mobile communications), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the present embodiments described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

What is claimed is:

1. A terminal comprising:
   a receiver that receives a plurality of entries of information related to a spatial resource for an uplink control channel by using a higher layer, and receives specification information specifying at least one entry among the plurality of entries by using a downlink shared channel; and
   a processor that controls transmission of HARQ information for the downlink shared channel, based on feedback timing of the HARQ information and application timing of the spatial resource based on the specification information,
   wherein the information related to the spatial resource for the uplink control channel associated with the at least one entry is applied to a plurality of uplink control channels.

2. The terminal according to claim 1, wherein the processor determines whether or not to apply the spatial resource specified by the specification information to the transmission of the HARQ information, based on a relationship between the feedback timing and the application timing.

3. The terminal according to claim 2, wherein the processor determines whether or not to transmit the HARQ information, based on a relationship between the feedback timing and the application timing.

4. The terminal according to claim 1, wherein the processor determines different feedback timing, based on whether or not the downlink shared channel includes the specification information.

5. The terminal according to claim 1, wherein when downlink control information used to schedule the downlink shared channel does not include an indication of the feedback timing, the processor applies the spatial resource configured in advance to the transmission of the HARQ information.

6. A radio communication method for a terminal, the radio communication method comprising:
 receiving a plurality of entries of information related to a spatial resource for an uplink control channel by using a higher layer, and receiving specification information specifying at least one entry among the plurality of entries by using a downlink shared channel; and
 controlling transmission of HARQ information for the downlink shared channel, based on feedback timing of the HARQ information and application timing of the spatial resource based on the specification information,
 wherein the information related to the spatial resource for the uplink control channel associated with the at least one entry is applied to a plurality of uplink control channels.

7. The terminal according to claim 2, wherein the processor determines different feedback timing, based on whether or not the downlink shared channel includes the specification information.

8. The terminal according to claim 3, wherein the processor determines different feedback timing, based on whether or not the downlink shared channel includes the specification information.

9. The terminal according to claim 2, wherein when downlink control information used to schedule the downlink shared channel does not include an indication of the feedback timing, the processor applies the spatial resource configured in advance to the transmission of the HARQ information.

10. The terminal according to claim 3, wherein when downlink control information used to schedule the downlink shared channel does not include an indication of the feedback timing, the processor applies the spatial resource configured in advance to the transmission of the HARQ information.

11. The terminal according to claim 4, wherein when downlink control information used to schedule the downlink shared channel does not include an indication of the feedback timing, the processor applies the spatial resource configured in advance to the transmission of the HARQ information.

12. A base station comprising:
 a transmitter that transmits a plurality of entries of information related to a spatial resource for an uplink control channel by using a higher layer signaling, and transmits specification information specifying at least one entry among the plurality of entries by using a downlink shared channel; and
 a processor that indicates, to a terminal, to transmit HARQ information for the downlink shared channel, based on feedback timing of the HARQ information and application timing of the spatial resource based on the specification information,
 wherein the information related to the spatial resource for the uplink control channel associated with the at least one entry is applied to a plurality of uplink control channels.

13. A system comprising a terminal and a base station, wherein:
 the terminal comprises:
  a receiver that receives a plurality of entries of information related to a spatial resource for an uplink control channel by using a higher layer, and receives specification information specifying at least one entry among the plurality of entries by using a downlink shared channel; and
  a processor that controls transmission of HARQ information for the downlink shared channel, based on feedback timing of the HARQ information and application timing of the spatial resource based on the specification information, and
 the base station comprises:
  a transmitter that transmits the plurality of entries of the information related to the spatial resource for the uplink control channel by using the higher layer signaling, and transmits the specification information specifying the at least one entry among the plurality of entries by using the downlink shared channel; and
  a processor that indicates, to the terminal, to transmit the HARQ information for the downlink shared channel,
 wherein the information related to the spatial resource for the uplink control channel associated with the at least one entry is applied to a plurality of uplink control channels.

* * * * *